UNITED STATES PATENT OFFICE.

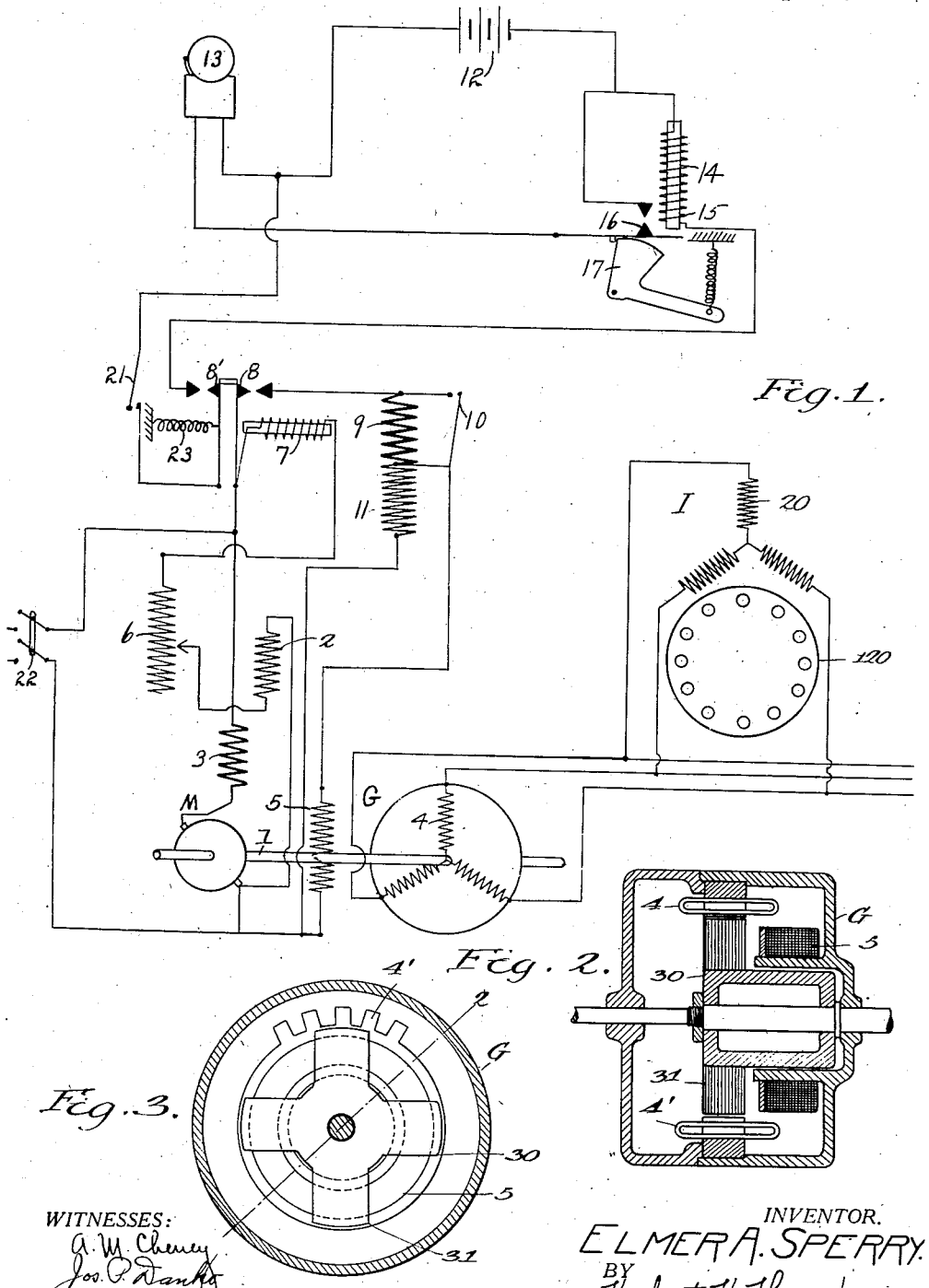

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

ELECTRIC DRIVE FOR GYROSCOPES.

1,301,014.  Specification of Letters Patent.  Patented Apr. 15, 1919.

Application filed February 9, 1915. Serial No. 7,027.

*To all whom it may concern:*

Be it known that I, ELMER A. SPERRY, a citizen of the United States of America, residing at Brooklyn, New York, have invented certain new and useful Improvements in Electric Drives for Gyroscopes, of which the following is a specification.

This invention relates to alternating current machinery of the induction type. More particularly it relates to the application of this type of electrical energy to the driving of gyroscopic apparatus.

Several peculiar difficulties present themselves in the application of electric drive to gyroscopes, especially to the driving of the rotor of a gyro-compass on shipboard. Polyphase alternating current is of course preferable, but as this is not in general available, a special A. C. generator, preferably motor driven, must be provided. Again, the actual power required to drive a gyroscope, after it is brought up to speed is very small, so that efficiency demands that the generator set be small. But the starting of a gyroscope requires a heavy current and will cause trouble unless special apparatus is provided to reduce the starting current, since the rotor of a gyroscope necessarily possesses a large moment of inertia compared to the bearing friction.

Among other requirements for the successful operation of a gyroscopic compass may be mentioned the following: First, its starting and control must be as simple as possible, so that an ordinary seaman can handle it; Second, it must be run at a constant, predetermined speed; Third, the operator should be able to detect immediately any trouble with the supply; Fourth, failure in the supply current must have no effect on the accuracy of the compass for as long a period as possible.

The objects of my invention are to overcome the above mentioned difficulties and to accomplish certain other results, which will become apparent as the description proceeds.

If the usual type of D. C.-A. C. motor-generator were employed, when the gyro and the motor-generator were started together, a starting box would have to be used and the motor brought very slowly up to speed by an attendant, in order not to overheat the windings of the gyro, as the gyro picks up speed very slowly, requiring about half an hour. Also, in case of the failure of the main supply source, while the compass was running, it is very desirable that the rotor not be decelerated but allowed to continue to run, while with many designs of apparatus the rotor would act as a generator, tending to drive the alternator as a motor and thus rapidly slow down the rotor.

With my invention, I am enabled to throw in the supply switch and start the motor-generator and rotor without any further supervision or any intermediate adjustments. One of the principal steps toward accomplishing this result is the design of the windings on the alternator and rotor for certain predetermined characteristics. By designing these windings so that in starting there will be introduced automatically into the line variations in the angle of lag or lead of the current with reference to the electromotive force, so that the current output of the generator will be markedly reduced (or increased) by such variation, I am enabled to produce an apparatus which can be started without manipulation. More specifically, the generator is designed with a weak field so that the magnetic strength of the field is reduced by such variations, while the gyrostator coöperating therewith has windings designed for high inductance, so as to produce automatically such variations. The type of generator which is so affected is one which designedly has a low regulative factor, although not limited to any particular type of generator.

For the other details of my invention, reference is had to the drawings, in which Figure 1 is a wiring diagram of apparatus embodying my invention, Fig. 2 is a diagrammatic sectional view of my preferred form of generator, and Fig. 3 is an elevation thereof. The section is taken on line 2—2, Fig. 3. While, broadly, my invention includes driving an A. C. generator by any suitable source of power, I prefer to employ an electric drive, such as a D. C. motor forming a motor-generator set 1 adapted to be run from any available source, such as the usual dynamos on a ship. The motor end M of this machine is preferably a compound wound machine with the series field wound so as to permit starting on the full line voltage without rheostat, 2 denoting the shunt portion of the field and 3 the series portion.

The generator end G is preferably of the inductor-alternating type in which the rotor 30 possesses no winding, but is serrated to provide projections 31 and is magnetized by a laterally disposed fixed coil 5 extending circumferentially about it. The armature windings are shown at 4 and are located in slots 4' in the stator. The polyphase current from the armature coil 4 is led directly to the stator 20 of the induction motor I, the rotor 120 of which constitutes the rotor of the gyro-compass. Such a motor is shown in my co-pending application No. 634,594, for gyroscopic compasses filed June 21, 1911.

Preferably, a variable resistance 6 is placed in series with the shunt field 2 of the motor M, so that the voltage and frequency of the generator G may be adjusted to drive the motor I at a predetermined speed.

The field 5 of the generator is preferably separately controlled or excited, the main supply which drives motor M furnishing a suitable source for this purpose.

I also prefer to equip the driving mechanism with several safeguards, the principal one being designed to insure the free running of the gyro-wheel after the supply current fails or drops below the required voltage. By inspecting the apparatus already described, it will be noted that, if for any reason the driving means illustrated as motor M should fail and at the same time the field 5 be maintained, motor I, having much the greater inertia would quickly start to act as a generator and drive the alternator as an induction motor. This load would quickly drag the speed of the gyro down and destroy its directive power. Accordingly, I provide means for preventing this undesirable action. I prefer to employ for this purpose an automatic switch 8 in circuit with the D. C. field 5 of the generator, said switch being made responsive to a partial or total failure in the generator driving means. A high resistance 11 may be connected across the terminals of coil 5 to reduce sparking. Where a motor is used for driving the switch 8 may be governed by the supply voltage, being made responsive to variations therein, as by controlling it by electro-magnetic means 7 placed preferably in circuit with the shunt field 2 of the motor. While it may appear at first glance, in the apparatus as shown, that in case the main supply should fail, field 5 would become deenergized without the aid of switch 8, such is not found to be the case, since, in such a contingency, the motor M acts as a generator and maintains the field at a reduced potential. Switch 8 is designed to open as soon as the potential drops below a predetermined amount, thus effectively preventing a material lessening of the speed of the gyro. By locating the solenoid 7 in circuit with a winding of high induction such as field 2, the switch 8 is given another characteristic, namely, that of delayed closing after the starting of motor M. This function gives the generator driving means time to gain a predetermined speed before the gyro load is thrown in.

I also find it highly desirable to employ an alarm or danger signal system as a means of informing the attendant in case a failure of the main supply occurs. Electro-magnetic switch 7, 8 may also be used to control this system by making the switch double, the portion 8' serving to close the alarm circuit under the influence of spring 23 as soon as winding 7 becomes weakened. Said alarm circuit includes a suitable supply source 12, a signal bell 13 or other indicating means, and preferably a relay 14, designed to cause continuous ringing of bell 13. Said relay comprises an electro-magnetic coil 15 which attracts, when energized, an armature serving to close switch 16. A positive locking catch 17 is arranged to drop into position when the switch is closed. The arrangement is such that as soon as the alarm portions 8' of switch 8 is closed, the current flowing through coil 15 closes switch 16, which, it will be seen, will remain closed and ring the alarm until the catch is released.

As pointed out in my prior application above referred to, the gyro-rotor is normally run *in vacuo*. In case air should leak in, the additional friction would tend to reduce the speed of the rotor. Means is accordingly provided whereby the torque on the motor may be readily increased in such a contingency. Preferably, I boost the voltage supplied to the rotor without changing the frequency. This may be done by cutting out a resistance 9 normally in circuit with the field coil 5. A switch 10 which closes a short circuit around resistance 9 is provided for this purpose.

The operation of my invention may be described as follows: The variable resistance 6 is normally adjusted to a point such that the speed of the motor will produce the required voltage and frequency in the A. C. line. To start the motor-generator set and gyroscope, all that the operator need do is to close the main supply switch 22. The apparatus then automatically takes care of itself through the following cycle of operations.

As switch 8 is normally pulled to the left in Fig. 1, the field of the alternator will remain unexcited until the solenoid 7 becomes strong enough to close the switch. Since this solenoid is in circuit with the shunt field 2, it will readily be seen that the closing of the switch will be delayed by the inductance of the field so that by proper adjustment the switch can be made to close only when the motor has attained about the speed necessary to drive the alterator at the required speed. As soon as switch 8 is closed, the field 5 is excited and a current sent through the stator coils 20. The gyro then starts to pick up speed so slowly that overheating is effectively prevented and the load on the generator kept down by the automatic introduction of variations in the phase angle, caused preferably by the inductive reactance of the gyro stator winding on the inductor alternator. Indeed, this method has proved so effective in preventing an excessive flow of current that I find the gyro may even be reversed at full speed with no undesirable effects. This feature proves of great advantage in testing, where it is desired to stop the gyro frequently, as otherwise hours would be wasted waiting for the gyro to come to rest.

Another very important point is as follows: In case the main supply current should fail, or the voltage drop below a predetermined amount, switch 8 would immediately open, thus deënergizing the field 5 and preventing the alternator from acting as a motor and from slowing down the gyroscope. At the same time switch 8' would be closed, ringing the alarm, as explained. If the main supply should come on again without warning, no harm would be done and switch 8 would close itself again when the motor had reached the proper speed.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means.

What I claim and desire to secure by Letters Patent is:

1. In an electric driving system for gyroscopes, a generator, means for driving the generator, a motor for driving the gyro normally in circuit with said generator, and means responsive to failure of said generator driving means for deënergizing the field circuit of the generator.

2. In an electric driving system for gyroscopes, a generator provided with a separately controlled field circuit, a motor for driving the gyro normally in circuit with said field circuit, and means responsive to failure of said generator driving means for opening the field circuit of said generator.

3. In electrical mechanism for driving a gyroscope the combination with a D. C. source of supply, of a motor adapted to be driven from said supply, a generator driven by said motor, the field circuit of said generator being normally excited by said supply, and means responsive to variations in the supply voltage for opening and closing the field circuit of the generator.

4. In electrical mechanism for driving a gyroscope the combination with a D. C. source of supply, of a motor adapted to be driven from said supply, a generator driven by said motor, the field circuit of said generator being normally excited by said supply, and means responsive to a drop in the supply voltage for opening the field circuit of the generator.

5. In electrical mechanism for driving a gyroscope the combination with a source of supply, of a motor adapted to be driven from said supply, a generator driven by said motor, the field circuit of said generator being normally excited by said supply, means responsive to variations in the supply voltage for opening and closing the field circuit of the generator, and means for delaying the closing of said field circuit.

6. In an electric driving system for gyroscopes, a generator, means for driving the generator, a motor for driving the gyro, normally in circuit with said generator and means for holding the field of the generator open for a predetermined interval after the said driving means becomes active.

7. In electrical mechanism for driving a gyroscope, the combination with a source of supply, of a motor adapted to be driven from said supply, a starting switch therefor, a generator driven by said motor, the field circuit of said generator being normally excited by said supply, and means for holding the field circuit of the generator open a predetermined interval after the closing of said switch.

8. In an electric driving system for gyroscopes, a generator provided with a separately controlled field circuit, a motor for driving the gyro normally in circuit with said field circuit, and means responsive to failure of the motor supply circuit for opening the field of said generator.

9. The combination with the rotor of a gyroscope, of an induction motor for driving the same having windings of high inductance, and an inductor-alternator for driving said motor having a low-regulative factor, whereby in starting or reversing the motor a large variation in the phase angle of the current with reference to the electromotive force is introduced which limits the output of the generator.

10. Electrical mechanism for driving a gyroscope comprising a motor-generator set, and an automatic switch in circuit with the field windings of the generator controlled by the supply voltage whereby the load is thrown in and out automatically upon variations in said supply voltage.

11. Electrical mechanism for driving a gyroscope comprising a motor-generator set, an automatic switch in circuit with the field windings of the generator controlled by the voltage across the motor field whereby the load is thrown in and out automatically but its closing delayed upon variations in the supply voltage.

12. Electrical mechanism for driving a gyroscope comprising a motor, an inductor alternator connected with said motor, an induction motor in circuit with said alternator for rotating the gyro, automatic means for throwing the load in a predetermined interval after the starting of the alternator, the alternator and induction motor being so designed that in starting or reversing the gyroscope the reactive inductance of the motor will prevent automatically an excessive starting current or an excessive load on the motor-generator.

13. Electrical mechanism for driving a gyroscope comprising a compound wound motor adapted to be thrown directly on the line, an inductor-alternator driven by said motor, the field windings of said alternator being excited from said line, a switch for throwing said field in and out of circuit, automatic means for delaying the closing of the switch in starting, and an induction motor supplied by said alternator for driving the gyroscope, whereby the entire mechanism may be started or the gyroscope reversed without the employment of manual regulating means.

14. Electrical mechanism for driving a gyroscope comprising an inductor-alternator having a separately controlled field circuit, a motor for driving said alternator and an automatic switch, including an inductive winding, for exciting said field circuit responsive to closing a circuit through said motor whereby the excitation of the alternator is delayed.

15. Electrical mechanism for driving a gyroscope comprising an inductor-alternator having a separately controlled field circuit, a motor having a shunt field winding for driving said alternator, a switch for exciting said alternator field circuit, and electromagnetic means in circuit with said motor field winding for closing said switch a predetermined interval after the motor is started.

16. The combination with the rotor of a gyroscope of an induction motor for driving the same having windings of high inductance, an inductor-alternator for driving said motor having a low-regulative factor and a separately controlled field circuit, a motor for driving said alternator, and an automatic switch including an inductive winding for exciting said circuit a predetermined interval after the closure of the motor circuit, whereby the excitation of the generator is delayed and when excited, a large variation in the phase angle of the current supplied the induction motor with reference to the electro-motive force is introduced.

17. In an electrical driving system for the rotors of gyroscopes, the combination with a gyroscope, of a motor for driving the rotor thereof having a high inductance winding and a motor generator set having a low regulative factor for supplying said motor whereby the gyro-motor may be started or reversed without current limiting devices during the normal operation of the motor generator set.

In testimony whereof, I have signed my name to this specification in the presence of two subscribing witnesses, this 21st day of January, 1915.

ELMER A. SPERRY.

Witnesses:
ETHEL M. BAUMGARTNER,
P. L. ANDERSON.